US012580773B2

(12) United States Patent　　(10) Patent No.: US 12,580,773 B2
Torfs　　　　　　　　　　　　　　 (45) Date of Patent: Mar. 17, 2026

(54) METHODS AND APPARATUSES FOR PROVIDING A PROOF OF AUTHENTICITY OF IMAGE DATA

(71) Applicant: Sony Group Corporation, Tokyo (JP)

(72) Inventor: Dimitri Torfs, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 285 days.

(21) Appl. No.: 18/275,407

(22) PCT Filed: Feb. 25, 2022

(86) PCT No.: PCT/EP2022/054825
§ 371 (c)(1),
(2) Date: Aug. 2, 2023

(87) PCT Pub. No.: WO2022/184587
PCT Pub. Date: Sep. 9, 2022

(65) Prior Publication Data
US 2024/0313978 A1　　　Sep. 19, 2024

(30) Foreign Application Priority Data

Mar. 5, 2021　(EP) ..................................... 21160916

(51) Int. Cl.
*H04L 9/32* 　　　(2006.01)
*H04L 9/00* 　　　(2022.01)

(52) U.S. Cl.
CPC .......... *H04L 9/3247* (2013.01); *H04L 9/3236* (2013.01); *H04L 9/50* (2022.05)

(58) Field of Classification Search
CPC ... H04L 9/3236; H04L 9/3247; H04L 9/3297; H04L 9/50
See application file for complete search history.

(56) References Cited

U.S. PATENT DOCUMENTS

2009/0271847 A1*　10/2009　Karjala ............... H04L 63/0807
　　　　　　　　　　　　　　　　　726/6
2017/0085562 A1　　3/2017　Schultz et al.
(Continued)

FOREIGN PATENT DOCUMENTS

CN　　　　111460526 A　*　7/2020　............. G06F 16/71

OTHER PUBLICATIONS

Dobre et al., "Authentication of JPEG Images on the Blockchain" [Online], Apr. 25, 2019 [Retrieved on: Jul. 10, 2025], 2018 ICCAIRO, Retrieved from: < https://ieeexplore.ieee.org/stamp/stamp.jsp?tp= &arnumber=8698425 > (Year: 2018).*
(Continued)

*Primary Examiner* — Eric W Shepperd
(74) *Attorney, Agent, or Firm* — XSENSUS LLP

(57) ABSTRACT
The present disclosure relates to an image sensor device (100). The image sensor device (100) has a data communication interface (110) configured to receive a hash value (112), a cryptographically secure storage (120) storing a cryptographic key (122) of the image sensor device, and a processor (140) configured to sign captured image data (132) or a processed version thereof and the received hash value (112) using the cryptographic key (122) to generate a signature (142) of the image data. The data communication interface (110) is configured to transmit the generated signature (142), the captured image data (132), and an identifier (150) of the image sensor.

20 Claims, 3 Drawing Sheets

(56) References Cited

U.S. PATENT DOCUMENTS

| | | |
|---|---|---|
| 2017/0331635 A1 | 11/2017 | Barinov et al. |
| 2018/0121635 A1 | 5/2018 | Tormasov et al. |
| 2019/0385269 A1 | 12/2019 | Zachary |
| 2020/0320679 A1 | 10/2020 | McGregor et al. |

OTHER PUBLICATIONS

International Search Report and Written Opinion mailed on Jun. 7, 2022, received for PCT Application PCT/EP2022/054825, filed on Feb. 25, 2022, 10 pages.

"Proof of Existence", GitHub, Available Online at: docs. proofofexistence.com/#/?id=proof-of-existence, Retrieved from net on: Jun. 13, 2023, pp. 1-6.

"Moving Mobile Forward Interface specifications for mobile, automotive, IoT and more", Available Online at: https://www.mipi.org, 13 pages, Jun. 13, 2023.

"Transform your business with IMX500 Intelligent Vision Sensor", Available Online at: https://developer.sony.com/develop/imx500/, Retrieved from net on: Jun. 13, 2023, pp. 1-12.

"Sony to Release World's First Intelligent Vision Sensors with AI Processing Functionality", Sony, Available Online at: https://www. sony.com/en/SonyInfo/News/Press/202005/20-037E/, May 14, 2020, pp. 1-8.

* cited by examiner

METHODS AND APPARATUSES FOR PROVIDING A PROOF OF AUTHENTICITY OF IMAGE DATA

CROSS-REFERENCE TO RELATED APPLICATIONS

The present application is based on PCT filing PCT/EP2022/054825, filed Feb. 25, 2022, which claims priority to European Patent Application No. 21160916.9, filed Mar. 5, 2021, the contents of each are hereby incorporated by reference.

FIELD

The present disclosure relates to methods and apparatuses for providing a proof of authenticity of image/vision data generated by an image/vision sensor.

BACKGROUND

Proof-of-time aims to prove or at least to provide strong evidence that an image is taken at a particular time. It is well known how to prove that an image is taken before a certain time, e.g., proof-of-existence. For example, this can be achieved by recording a hash value of the image on a blockchain (whose timestamps are trusted). In this way it may be proven that the image corresponding to the hash existed at the time of the timestamp of the block on the blockchain.

To prove than an image was taken after a certain time is, however, more difficult.

SUMMARY

This problem is addressed by methods and apparatuses of the appended independent claims. Potentially advantageous embodiments are addressed by the dependent claims.

In accordance with a first aspect of the present disclosure, it is proposed a method for providing a proof of authenticity of image data generated by an image sensor. The method includes obtaining an authentic hash value, capturing image data with the image sensor, signing the image data (or a processed version thereof) and the authentic hash value using a cryptographic key of the image sensor to generate a signature of the image data, and providing the signature, the image data, and a unique identifier of the image sensor to an application processor. Thus, the image sensor supports secure signing of captured image data together with an externally provided hash. This is verifiable by a trusted service, for example.

In some embodiments, the image data may relate to a still image. However, it is also conceivable that the image data relates moving images (e.g., video data).

In some embodiments, the application processor may comprise hardware and/or software designed for an end-user. For example, the application processor may comprise a computer program (app) designed to help people perform an activity, such as providing authentic image data. The application processor may be external to the (secure) image sensor.

In some embodiments, the image sensor may integrate a logic processor and memory that can convert the image sensor into a microcomputer. Thus, an image sensor chip may perform artificial intelligence (AI) tasks to identify, analyze or count targets of interest without having to share the information with another chip, improving privacy and data security and promising near real-time analysis and target tracking.

In some embodiments, the signature may be generated by a processor integrated with the image sensor. The image sensor may be configured to securely embed the cryptographic key in the image sensor. The cryptographic key may be securely embedded in the image sensor at manufacturing time of the image sensor. For example, the cryptographic key may be burned into an image sensor chip (module), making it hard for an attacker to recover the cryptographic key. Alternatively, one can make use of PUFs (Physical Unclonable Functions) to protect the cryptographic key, for example.

In some embodiments, the cryptographic key may be a key of a symmetric-key algorithm using the same cryptographic keys for both encryption of plaintext and decryption of ciphertext. The keys may be identical or there may be a simple transformation to go between the two keys.

In some embodiments, the cryptographic key may be a key of a public-key algorithm, or asymmetric algorithm, which is a cryptographic concept which uses pairs of keys: public keys (which may be known to others), and private keys (which may never be known by any except the owner). The generation of such key pairs depends on cryptographic algorithms which are based on mathematical problems termed one-way functions. Effective security requires keeping the private key private; the public key can be openly distributed without compromising security. For example, the cryptographic key of the image sensor may be a private key securely embedded in the image sensor.

In some embodiments, the authentic hash value may be associated with one or more of a time, a location, or a device where the authentic hash value was created. A hash function of a trusted entity/device (e.g., different from the image sensor) may be used to map data (e.g., time, location, device identification (ID, etc.) of arbitrary size to fixed-size values. The values returned by a hash function are called hash values or simply hashes.

In some embodiments, obtaining the authentic hash value may comprise the application processor reading a hash value from a latest block on a blockchain. Such a block hash value may then be authentically indicative of a time when the latest block was created. A blockchain is a growing list of records, called blocks, that are linked using cryptography. Each block contains a cryptographic hash of the previous block, timestamp, and transaction data (generally represented as a Merkle tree). By design, a blockchain is resistant to modification of its data. This is because once recorded, the data in any given block cannot be altered retroactively without alteration of all subsequent blocks.

In some embodiments, obtaining the authentic hash value may comprise the application processor forwarding the authentic hash value to the image sensor. For example, a block hash value retrieved from a latest block on a blockchain may be forwarded to the image sensor for signing the image data.

After signing the image data, the signature, the image data, and the unique identifier may be provided from the (secure) image sensor to the application processor. Further, a hash value of the image data (image hash value) may be provided from the (secure) image sensor to the application processor. A communication interface between the application processor and the (secure) image sensor may be a wired or a wireless data interface.

In some embodiments, the image hash value may be stored on a blockchain. For this purpose, the application processor may have access to a peer-to-peer network collectively adhering to a protocol for inter-node communication and validating new blocks of the blockchain.

In some embodiments, the signature (of the image data), the image data itself and/or a hash value thereof (image hash value), the authentic hash value, and the unique identifier of the image sensor may be provided from a proving entity to a verifying entity (e.g., attestation service). The verifying entity may verify the signature (of the image data) using the image sensor's unique identifier and a cryptographic key of the image sensor (e.g., public key or symmetric key). The verifying entity may then indicate whether the signature (of the image data) was successfully verified. In the latter case, the authenticity of the image data may be proven. For example, verifying the signature may be performed by a trusted attestation entity in possession of the image sensor's cryptographic key.

In some embodiments, a first time indicating when the authentic hash value has been created may be identified if the signature was successfully verified. Based on the first time it may be proven that the image was captured after the first time (the time of the authentic hash value).

In some embodiments, a second time associated with the image hash value may be identified (the time of the image data). Based on the first and second time it may be proven that the image was captured between the first and the second time.

In accordance with a further aspect of the present disclosure, it is proposed a further method for providing a proof of authenticity of image data generated by an image sensor. The method includes receiving, at a verifying entity (e.g., attestation service), a signature of image data and an authentic hash value, the image data and/or a hash value thereof, the authentic hash value, and a unique identifier of the image sensor from a proving entity (e.g., application processor). The signature is verified at the verifying entity using the unique identifier and a cryptographic key of the image sensor. The verifying entity indicates whether the signature was successfully verified.

In accordance with a further aspect of the present disclosure, it is proposed a further method for providing a proof of authenticity of image data generated by an image sensor. The method includes providing an authentic hash value from an application processor to the image sensor, capturing image data with the image sensor, signing the image data or a processed version thereof and the authentic hash value using a cryptographic key of the image sensor to generate a signature of the image data, providing the signature, the image data, and a unique identifier of the image sensor to the application processor, providing the signature, the image data and/or a hash value thereof, the authentic hash value, and the unique identifier of the image sensor from the application processor to a verifying entity, at the verifying entity, verifying the signature using the identifier and a cryptographic key of the image sensor, indicating whether the signature was successfully verified.

In accordance with a further aspect of the present disclosure, it is proposed an image sensor device. The image sensor device comprises a data communication interface configured to receive an authentic hash value, a cryptographically secure storage storing a cryptographic key of the image sensor device, a processor configured to sign captured image data or a processed version thereof and the authentic hash value using the cryptographic key to generate a signature of the image data. The data communication interface is configured to transmit the generated signature, the captured image data, and an identifier of the image sensor.

Embodiments of the present disclosure may provide a root-of-trust that may enable various proof-of-origin scenarios for captured images. Proof-of-origin may include proof-of-location (e.g., where the image is taken), proof-of-time (e.g., when the image is taken), proof-of-device (e.g., which device took the image). The different proof-of-xxxx use cases depend on what is captured by the authentic hash value supplied by the application processor.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
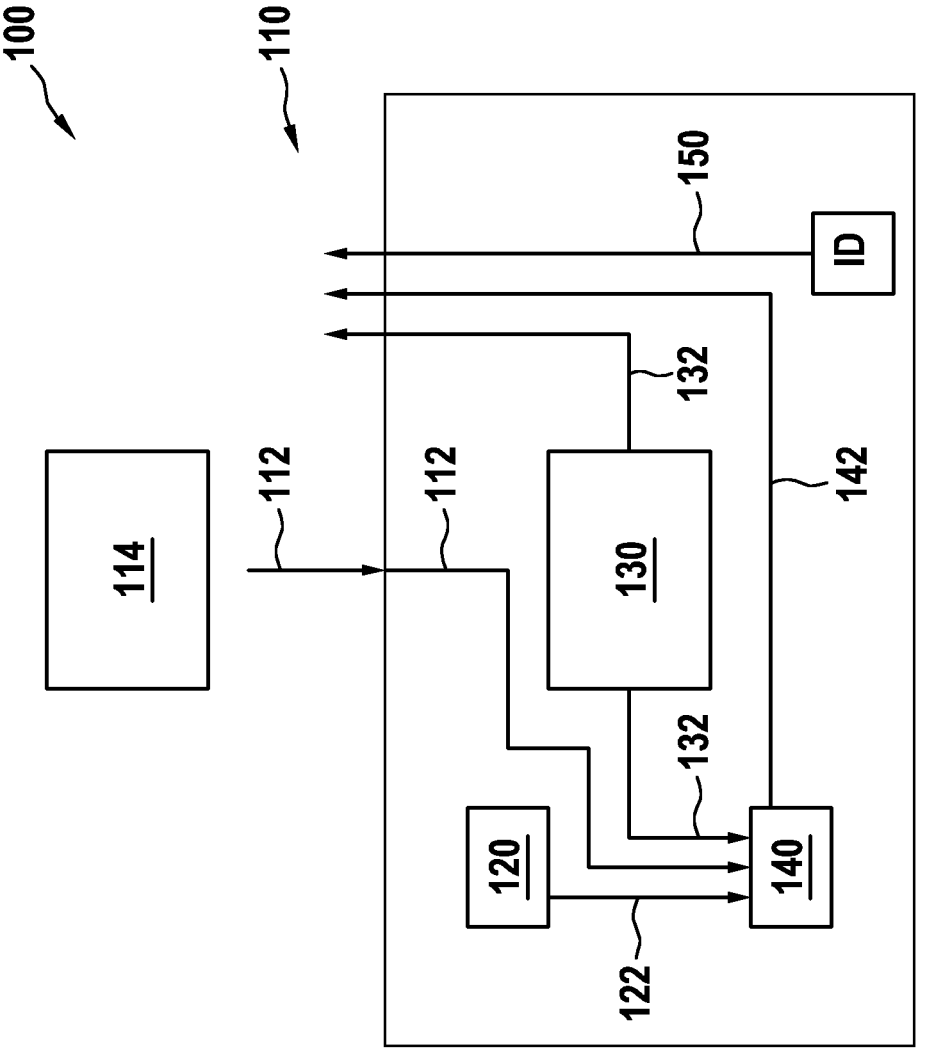
FIG. 1 shows a block diagram of a vision sensor device in accordance with embodiments of the present disclosure.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a block diagram of an image or vision sensor device 100 according to the present disclosure.

The vision sensor device 100 comprises a data communication interface 110 configured to receive a hash value 112 from an external entity, such as an application processor 114 external to the vision sensor device 100, for example. The vision sensor device 100 comprises a cryptographically secure memory 120 storing a cryptographic key 122 of the image sensor device 100. The vision sensor device 100 comprises an internal vision sensor 130 configured to capture one or more images 132 of a surrounding environment. The vision sensor device 100 comprises an internal processor 140 configured to sign a combination of the captured images (or a processed version thereof) 132 and the received hash value 112 using the cryptographic key 122 from the cryptographically secure storage 120 to generate a signature 142 of the image data (image signature). Signature 142 will also be referred to as SIVS signature (SIVS=Secure Intelligent Vision Sensor). The data communication interface 110 is configured to transmit the generated SIVS signature 142, the captured image(s) 132, and an identifier (ID) 150 of the vision sensor 100. For example, the generated SIVS signature 142, the captured image(s) 132, and an identifier (ID) 150 of the vision sensor 100 may be returned to the external application processor 114 via data communication interface 110.

The data communication interface 110 may be a wired data communication interface. For example, the data communication interface 110 between the vision sensor device 100 and the application processor 114 may comprise SPI (Serial Peripheral Interface), MIPI (MIPI Display Serial Interface), I2C (Inter-Integrated Circuit), or UART (Universal Asynchronous Receiver Transmitter).

Secure memory 120 may include any suitable non-transitory, computer-readable medium embedded in a packaging with physical security measures, which give it a degree of tamper resistance. Alternatively, or additionally, physical unclonable function (PUF) may be used to securely store the cryptographic key 122 in the secure memory 120. A PUF is a physical object that for a given input and conditions (challenge), provides a physically defined "digital fingerprint" output (response) that serves as a unique identifier, most often for a semiconductor device such as a microprocessor. PUFs are most often based on unique physical variations which occur naturally during semiconductor manufacturing. A PUF is a physical entity embodied in a physical structure.

Thus, "secure" memory 120 may refer both to a manufacturing process as to a protection of the key in the chip at rest and at runtime. At manufacturing time, the manufacturing process may be secured such that keys created and burned into memory 120 cannot be spoofed during transfer from where they are generated to the memory 120 (e.g., using HSMs (Hardware Security Module)). To protect the key at rest, the key may be burned into the memory 120 (module), making it very hard for an attacker to recover the key. Or one can make use of PUFs (Physical Unclonable Functions) to protect the key. To protect the key at runtime, countermeasures may be taken against side-channel attacks that may leak information about the key (e.g., countermeasures against Electro Magnetic or Power Analysis attacks). Countermeasures may include constant-time operations, masking, etc.

In some embodiments, the internal vision sensor 130 may be configured as a camera including a passive-pixel sensor (PPS), an active-pixel sensor (APS), and/or a charge-coupled device (CCD) pixel sensor. Alternatively, the internal vision sensor 130 may be configured as a ToF (Time-Of-Flight) image sensor. The internal image sensor 130 can be used to capture photographs, videos, and/or other information pertaining to (visible) light, which is collectively referred to herein as image data. The image data is vision data that can be represented in a pixel array or other graphical manner that conveys physical properties regarding objects within the field of view of the vision sensor 130. In one embodiment, the image data can be video data (a plurality of sequential images) or pictures (i.e., static image data). In at least some embodiments, the image data can be captured using interlacing or progressive scanning techniques; however, other suitable techniques can be used as well. The image data can be captured at a set or at a pre-configured scanning or sampling frequency, and the camera may be configured to obtain image data of a particular resolution. Once the image data is obtained through using the internal vision sensor 130, the image data can be further processed by internal processor 140. The processor 140 may include processing capabilities that enable image processing techniques, including object recognition techniques, to be carried out at processor 140.

In some embodiments, the vision sensor 130 may be configured as a lidar sensor. A lidar may use non-visible light waves to obtain spatial or other physical information regarding one or more objects within the field of view of the vision sensor 130. In many embodiments, the lidar emits a plurality of light pulses (or pulsed laser light) and receives the reflected light pulses using a light sensor. The lidar includes an emitter that emits light waves via use of a light source and can include various circuitry and/or electronic components that enable adjusting characteristics of the generated light waves or pulses. The lidar can use its processor to compress the raw captured vision data and carry out other operations. Moreover, the image data captured by the lidar can be image data that is represented in a pixel array (or other similar visual representation) and can thus be considered an image sensor. The lidar can capture static lidar images and/or lidar image or video streams.

Alternatively, the vision sensor 130 may also be configured as a radar sensor, for example comprising a monolithic microwave integrated circuit (MMIC), for example. In this case, the one or more images may be radar images of the environment, such as so-called range-Doppler maps, for example. Radar is a vision sensor 130 that uses radio waves to obtain spatial or other physical information regarding one or more objects within the field of view of the radar. The radar includes a transmitter that transmits electromagnetic radio waves via use of a transmitting antenna and can include various electronic circuitry that enables the generation and modulation of an electromagnetic carrier signal. In other embodiments, the radar can transmit electromagnetic waves within another frequency domain, such as the microwave domain. The radar includes a signal processor, which can at least partially (e.g., fully) be implemented using the processor 140, or which may at least partially (e.g., fully) be implemented with dedicated circuitry. The radar can include a separate receiving antenna, or the radar can include a single antenna for both reception and transmission of radio signals. And, in other embodiments, the radar can include a plurality of transmitting antennas, a plurality of receiving antennas, or a combination thereof so as to implement multiple input multiple output (MIMO), single input multiple output (SIMO), or multiple input single output (MISO) techniques.

Processor 140 can be any type of device capable of processing electronic instructions including microprocessors, microcontrollers, host processors, controllers, and application specific integrated circuits (ASICs). Processor

140 may execute various types of digitally stored instructions, such as software or firmware programs, which enable the vision sensor device 100 to provide a wide variety of services. For instance, processor 140 can execute programs or process data to carry out at least a part of the methods discussed herein.

In an example implementation, the vision sensor device 100 may be a one-chip solution (for example, System on a Chip, SoC) comprising a stacked configuration of the internal vision sensor 130 (vision sensor chip) and the internal processor 140 (logic chip). For example, the vision sensor device 100 may be equipped with artificial intelligence (AI) image analysis and processing functionality on the processor 140. Raw image data acquired by the vision sensor 130 may be processed via AI on the vision sensor device 100, eliminating the need for high-performance processors or external memory. For example, the vision sensor device 100 may output metadata (semantic information belonging to image data) together with or instead of image information via the data communication interface 110, making for reduced data volume and addressing privacy concerns. Moreover, the AI capability may enable delivering diverse functionality for versatile applications, such as real-time object tracking with high-speed AI processing. Different AI models may be also be chosen by rewriting internal memory in accordance with user requirements or the conditions of the location where the system is being used.

Signals acquired by the internal vision sensor chip 130 may be run through an ISP (Image Signal Processor) and AI processing may be done in the process stage on the processor 140. The extracted information may be output as metadata, reducing the amount of data handled. Ensuring that image information is not output may help to reduce security risks and address privacy concerns. In addition to the image recorded by the vision sensor chip 130, users may select the data output format according to their needs and uses, including ISP format output images (YUV (Yellow, Magenta, Blue)/RGB (Red, Green, Blue)) and ROI (Region of Interest) specific area extract images.

In an example implementation, users can write AI models of their choice to an embedded memory of image sensor device 100 or processor 140 and can rewrite and update it according to its requirements or conditions of a location where the vision sensor device 100 is being used. For example, when multiple cameras employing the vision sensor device 100 are installed in a retail location, a single type of camera can be used with versatility across different locations, circumstances, times, or purposes. When installed at the entrance to the facility it can be used to count the number of visitors entering the facility; when installed on the shelf of a store it can be used to detect stock shortages; when on the ceiling it can be used for heat mapping store visitors (detecting locations where many people gather), and the like. Furthermore, the AI model in a given camera can be rewritten from one used to detect heat maps to one for identifying consumer behavior, and so on. The skilled person having benefit from the present disclosure will appreciate that the vision sensor device 100 may also be useful for automotive sensing applications to enable or promote autonomous driving.

In some embodiments, the application processor 114 external to vision sensor device 100 may comprise hardware and/or application software designed for end-users. For example, the application processor 114 may comprise a computer program configured to perform an activity or function related to the vision sensor device 100, such as providing authentic image or video data or proving authenticity of image or video data captured by vision sensor device 100. This may be useful for one or more of the following use cases:

Car rental: I want to proof that the rental car does not have any damages at the time I stopped the renting.

Corona quarantine: I want to proof that I am still at home by taking a picture.

Fake news: I can proof an image is taken now.

The application processor 114 may access or more databases at a backend facility that can store various information and can include a blockchain management database (not shown). The blockchain management database can store information for use in carrying out blockchain(s) that are used by one or more blockchain domain servers. The application processor 114 can thus act to distribute data, such as hash values, for example, to and from the various blockchain domain servers. The blockchain domain server implements a blockchain that includes blocks with one or more authentic hash values associated with one or more of a time, a location, or a device when and/or where the authentic hash value was created.

The block hash (i.e., a type of blockchain hash) is a hash that is generated using a hash function with the blockchain data of the block as an input. The block hash can use various hash (or hashing) functions including, for example, SHA-256 (or other secure hash algorithms (SHAs)) or Message-Digest Algorithm 5 (MD5). In many embodiments, a cryptographic hash function or a one-way hash function is used. And, in some embodiments, the blockchain data can be hashed using various techniques, such as using a Merkle tree (or hash tree).

To prove that an image was taken after a certain time, the application processor 114 may read a hash value from a latest block on a blockchain and provide this hash value as authentic hash value 112 to vision sensor device 100. Processor (logic chip) 140 may then cryptographically sign a combination of the captured one or more images 132 (or a processed version thereof) and the received hash value 112 using the cryptographic key 122 from the cryptographically secure storage 120. Note that the cryptographic key 122 may be a symmetric or asymmetric key, depending on the implementation.

Figure 2:
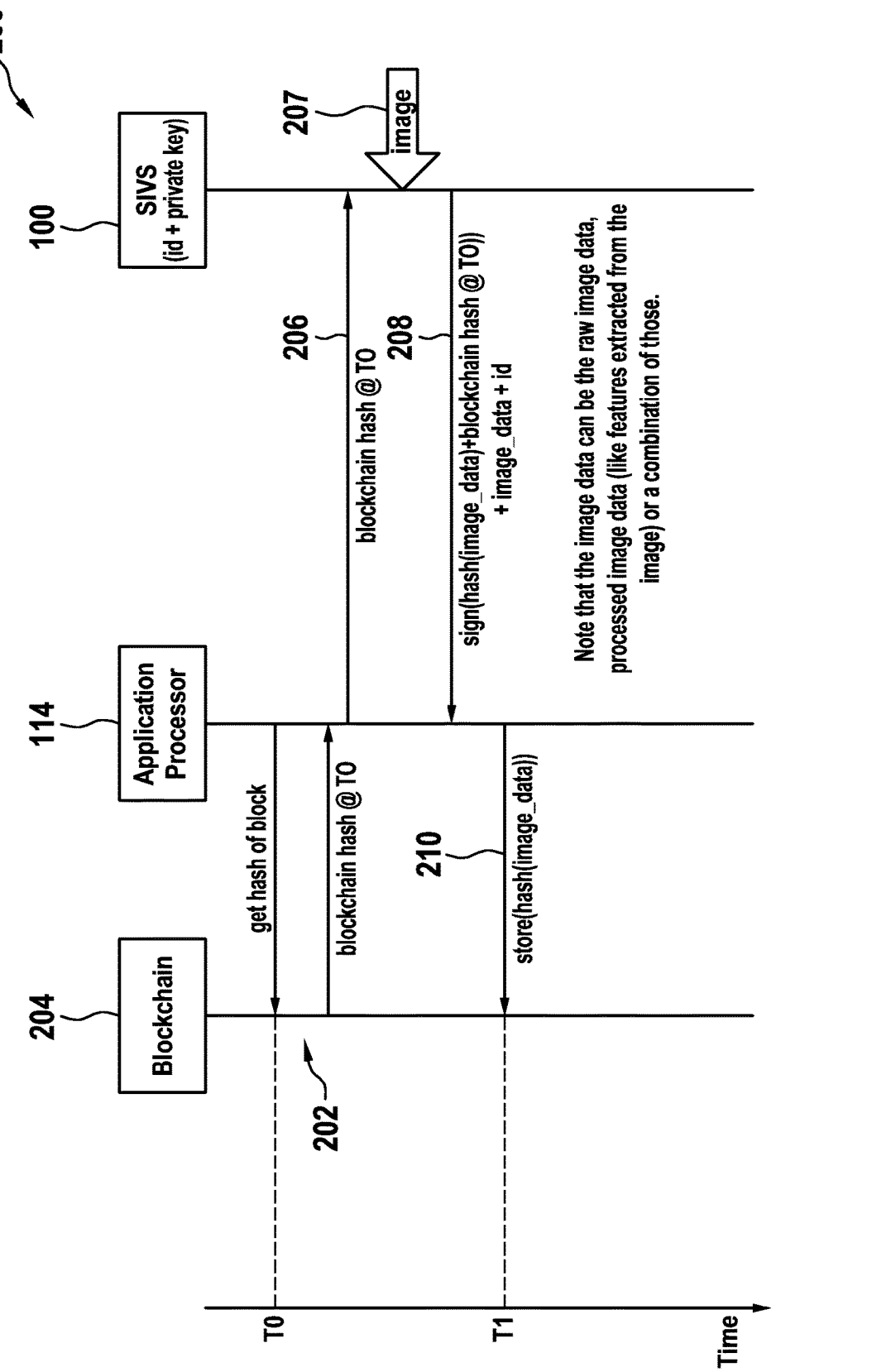
FIG. 2 shows a method for providing a proof of authenticity of image data generated by the image sensor of FIG. 1.

An example process 200 involving application processor 114 and vision sensor device 100 is shown in FIG. 2. The process 200 serves for providing a proof of authenticity of image data generated by vision sensor device 100 in accordance with the present disclosure.

At time T0, in act 202 of process 200, the application processor 114 reads the hash of the latest block on a blockchain 204. Assuming that the latest block was created at T0, the hash is indicative of time T0. For example, the application processor 114 may request the hash at time T0 (or a bit later) and the blockchain 204 may return the hash associated with time T0 to the application processor 114. Additionally, or alternatively, the hash may also be associated with, a location, or a device where the hash value was created. In act 206, the application processor 114 may then forward the hash (block_hash) associated with time T0 to the vision sensor device 100. The vision sensor device 100 may receive the hash value via its data communication interface 110.

When the vision sensor device or SIVS 100 captures an image after receipt of the hash (block_hash) associated with time T0 (see act 207), the SIVS 100 may create a SIVS signature (image_signature) 142 on a hash of the image data (hash_of_image data) and the hash (block_hash) associated with time T0 by using the vision sensor device's private key stored in secure memory 120. The SIVS signature (image_signature) 142, the image data 132, and a unique identifier 150 of the image sensor 100 may then be sent back to the application processor 114 (see act 208). The image data 132 may be raw image data, processed image data (e.g., features extracted from the image) or a combination of those. The application processor 114 may then store the hash of the image data (hash_of_image data) in blockchain 204 at time T1>T0 (see act 210).

In case there is only a need to prove an image is taken after a certain time (e.g., T0), the writing of the hash of the image data (hash_of_image data) onto the blockchain 204 can be omitted. That way there is no issue with the possible low transaction speed of the used blockchain 204. Another way to limit the writing (number of transactions) onto the blockchain 204 can be to bundle several image hashes before writing to the blockchain 204. In this case, only a hash of the bundle of image hashes will be written to the blockchain.

The process 200 of FIG. 2 may be summarized as follows. The process 200 comprises one or more acts 202, 206 of obtaining, at the vision sensor device 100, a hash value 112. Process 200 comprises an act 207 of capturing image data 132 with the vision sensor device 100. Process 200 comprises an act of signing the image data 132 or a processed version thereof and the obtained hash value 112 using the cryptographic key 122 of the vision sensor device 100 to generate a SIVS signature 142 of the image data. Process 200 comprises an act 208 of providing the SIVS signature, the image data, and a unique identifier of the vision sensor device 100 to the application processor 114.

Figure 3:
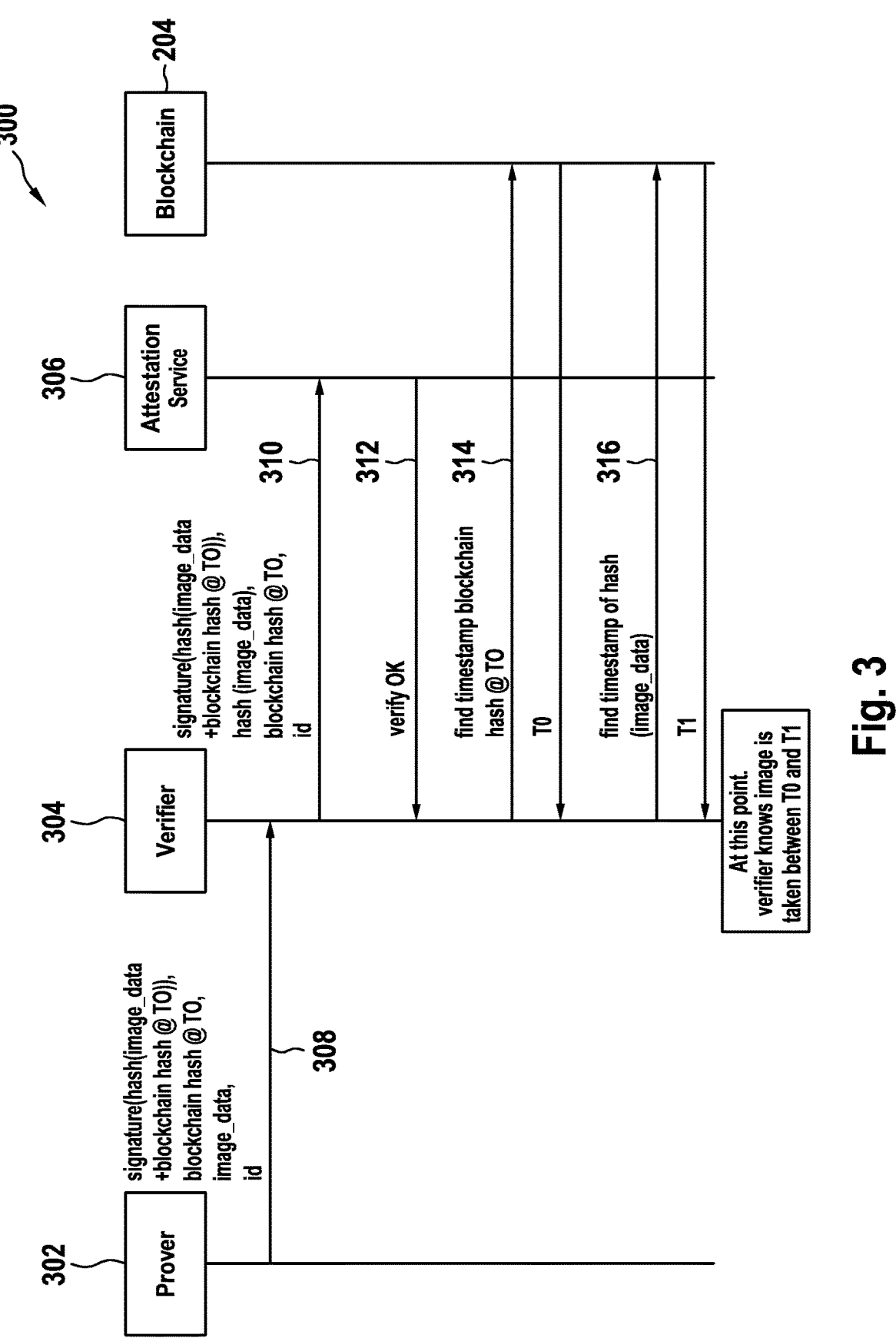
FIG. 3 shows a further method for providing the proof of authenticity of image data.

After the process 200 of signing image data, it may be proven that the image was taken after time T0 and before time T1. An example process 300, where a proving entity 302 wants to prove authenticity of image data to a verifying entity 304, is shown in FIG. 3.

In act 308 of process 300, the proving entity 302 may send the SIVS signature (e.g., signature of combination of image data (or hash thereof) and block hash at time T0), the block hash at time T0, the image data, and the ID of the vision sensor device 100 to the verifying entity 304. In act 310, the verifying entity 304 may forward the SIVS signature (e.g., signature of combination of image data (or hash thereof) and block hash at time T0), the hash at time T0, a hash of the image data, and the ID of the vision sensor device 100 to an attestation service 306 which can verify the SIVS signature. Note that the attestation service 306 may have knowledge about a public key of the vision sensor device 100, for example. In case of symmetric encryption, the attestation service 306 may have knowledge about a symmetric key of the SIVS 100. Once the SIVS signature is successfully verified at attestation service 306 and a verification response from attestation service 306 is received at 312 by the verifying entity 304, the verifying entity 304 may trust that the image with image_hash was taken at a time the block with block_hash existed on the blockchain (e.g., time T0). The verifying entity 304 may access blockchain 204 to find the timestamp of the block containing the block_hash at 314. Then, the verifying entity 304 may optionally access blockchain 204 to find the timestamp of the block containing the hash(image_data) at 316 (if the hash of the image data (hash_of_image data) was written onto the blockchain 204). If that timestamp is found to be T1, the verifying entity 304 knows the image was taken before T1. Overall, the verifying entity 304 may be assured the image was taken between T0 and T1.

The attestation service 306 may be dropped if public certificates are distributed which contain the public key and ID of the vision sensor device 100. In this case, anyone can validate the SIVS signature generated by the vision sensor device 100 by using this public certificate that contains the key that can be used to verify the SIVS certificate.

In case the proof-of-time is only needed for one specific verifying entity 304 (e.g., the origin of an image only needs to be proven to one specific verifying entity 304), the use of blockchain 204 may be dropped. Instead, the verifying entity 304 may periodically broadcast hashes that the application processor 114 may read and send to the vision sensor device 100 for signing. Also, the application processor 114 may send the image_hash directly to the verifying entity 304 instead of recording on the blockchain 204. At verification time (verifying T0), the verifying entity 304 may trust the timings of the hashes it broadcasted itself, so there is no need to rely on the blockchain for T0 verification. Of course, the verifying entity 304 will also know T1, since it corresponds to the time it received the image_hash directly from the application processor 114.

The process 300 of FIG. 3 may be summarized as follows. The process 300 comprises an act 308 of providing the SIVS signature 142, the image data and/or a hash value thereof, the authentic hash value 112, and the unique identifier 150 from a proving entity 302 to a verifying entity 304. The process 300 comprises an act 310 of verifying the SIVS signature 142 using the unique identifier 150 and a known cryptographic key of the vision sensor device 100. The process 300 comprises an act 312 of indicating whether the SIVS signature 142 was successfully verified.

Following are just some of the use cases where proof-of-time can be used:

Car rental: it is to be proven that a rental car does not have any damages at a time when renting is stopped.

Corona quarantine: a person wants to proof that (s)he is still at home by taking a picture.

Fake news: one can proof the image is taken now.

Embodiments of the present disclosure propose a Secure Intelligent Vision sensor (SIVS) 100 being an (intelligent) vision sensor (sensor+logic (AI)) that provides some basic security primitives. The security primitives comprise a unique hardware ID, a securely embedded (at manufacturing time) hardware key pair where at least the public part of the keypair is known by an attestation service, The ability to sign (processed) vision sensor data together with a hash that can be provided by the application processor.

Note that the SIVS chip 100 may only generate signatures on data that includes real-time captured (processed) sensor data. That is, the embedded cryptographic key will never be used to sign data that does not include the (processed) captured sensor data.

The SIVS 100 may come with an attestation service 306 (e.g., provided by the manufacturer of SIVS 100) that can validate the signatures of the SIVS 100. Note that this is optional. One can also distribute certificates, signed by the manufacturer as a Certificate Authority (CA), that contain the public key and ID of the SIVS 100.

The SIVS 100 may thus provide the root-of-trust that will enable various proof-of-origin scenarios for the images captured. Proof-of-origin includes proof-of-location (e.g., where the image is taken), proof-of-time (e.g., when the image is taken), proof-of-device (I.e., which device took the image). The different proof-of-xxxx use cases depend on what is captured by the hash supplied by the application processor. In the next sections, we will talk about proof-of-time.

Example 1 relates to a method for providing a proof of authenticity of image data generated by an image sensor, the method comprising obtaining an authentic hash value, capturing image data with the image sensor, signing the image data or a processed version thereof and the authentic hash value using a cryptographic key of the image sensor to generate a signature of the image data, providing the signature, the image data, and a unique identifier of the image sensor to an application processor.

In Example 2, the authentic hash value of Example 1 is associated with one or more of a time, a location, or a device where the authentic hash value was created.

In Example 3, obtaining the authentic hash value of Example 1 or 2 comprises the application processor reading a hash value from a latest block on a blockchain.

In Example 4, obtaining the authentic hash value of any one of the previous Examples comprises the application processor forwarding the authentic hash value to the image sensor.

In Example 5, the signature of any one of the previous Examples is generated at the image sensor, wherein the cryptographic key is securely embedded in the image sensor.

In Example 6, the signature, the image data, and the unique identifier of any one of the previous Examples is provided from the image sensor to the application processor.

In Example 7, the method of any one of the previous Examples further comprises storing a hash value of the image data on a blockchain.

In Example 8, the method of any one of the previous Examples further comprises providing the signature, the image data and/or a hash value thereof, the authentic hash value, and the unique identifier from a proving entity to a verifying entity, verifying the signature using the unique identifier and a cryptographic key of the image sensor, and indicating whether the signature was successfully verified.

In Example 9, verifying the signature of Example 8 is performed by a trusted attestation entity in possession of the image sensor's cryptographic key.

In Example 10, the method of Example 8 or 9 further comprises, if the signature was successfully verified, identifying a first time indicating when the authentic hash value has been created, and proving, based on the first time, that the image was captured after the first time.

In Example 11, the method of Example 10 further comprises identifying a second time associated with the image hash value, and proving, based on the first and second time, that the image was captured between the first and the second time.

Example 12 relates to a method for providing a proof of authenticity of image data generated by an image sensor, the method comprising, at a verifying entity, receiving a signature of image data and an authentic hash value, the image data and/or a hash value thereof, the authentic hash value, and a unique identifier of the image sensor from a proving entity, at the verifying entity, verifying the signature using the unique identifier and a cryptographic key of the image sensor, and indicating whether the signature was successfully verified.

Example 13 relates to a method for providing a proof of authenticity of image data generated by an image sensor, the method comprising providing an authentic hash value from an application processor to the image sensor, capturing image data with the image sensor, signing the image data or a processed version thereof and the authentic hash value using a cryptographic key of the image sensor to generate a signature of the image data, providing the signature, the image data, and a unique identifier of the image sensor to the application processor, providing the signature, the image data and/or a hash value thereof, the authentic hash value, and the unique identifier of the image sensor from the application processor to a verifying entity, at the verifying entity, verifying the signature using the identifier and a cryptographic key of the image sensor, and indicating whether the signature was successfully verified.

Example 14 relates to an image or vision sensor device, comprising a data communication interface configured to receive an authentic hash value, a cryptographically secure storage storing a cryptographic key of the image sensor device, a processor configured to sign captured image data or a processed version thereof and the authentic hash value using the cryptographic key to generate a signature of the image data, wherein the data communication interface is configured to transmit the generated signature, the captured image data, and an identifier of the image sensor.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. Method for providing a proof of authenticity of image data generated by an image sensor, the method comprising:
   obtaining a hash value from a source external to the image sensor;
   capturing the image data with the image sensor;
   signing a concatenation of the image data or a processed version thereof and the obtained hash value using a cryptographic key of the image sensor to generate a signature of the image data, wherein the signature is generated at the image sensor; and
   providing the signature, the image data, and a unique identifier of the image sensor to an application processor.

2. The method of claim 1, wherein the obtained hash value is associated with one or more of a time, a location, or a device where the obtained hash value was created.

3. The method of claim 1, wherein obtaining the hash value comprises the application processor reading a hash value from a latest block on a blockchain.

4. The method of claim 1, wherein obtaining the hash value comprises the application processor forwarding the hash value to the image sensor.

5. The method of claim 1, wherein the cryptographic key is securely embedded in the image sensor.

6. The method of claim 1, wherein the signature, the image data, and the unique identifier is provided from the image sensor to the application processor.

7. The method of claim 1, further comprising storing a hash value of the image data on a blockchain.

8. The method of claim 1, further comprising:
   providing the signature, the image data and/or an image hash value thereof, the obtained hash value, and the unique identifier from a proving entity to a verifying entity;
   verifying the signature using the unique identifier and a cryptographic key of the image sensor; and
   indicating whether the signature was successfully verified.

9. The method of claim 8, wherein verifying the signature is performed by a trusted attestation entity in possession of the image sensor's cryptographic key.

10. The method of claim 8, further comprising, if the signature was successfully verified,
   identifying a first time indicating when the obtained hash value has been created; and
   proving, based on the first time, that the image was captured after the first time.

11. The method of claim 10, further comprising:
   identifying a second time associated with the image hash value; and proving, based on the first and second time, that the image was captured between the first and the second time.

12. The method of claim 1, wherein the image data is processed at the image sensor to extract metadata, and wherein signing includes signing a concatenation of the metadata and the obtained hash value.

13. Method for providing a proof of authenticity of image data generated by an image sensor, the method comprising, at a verifying entity:
   receiving a signature of a concatenation of the image data and an authentic hash value from a source external to the image sensor, the image data and/or an image hash value thereof, the authentic hash value, and a unique identifier of the image sensor from a proving entity, wherein the signature is generated at the image sensor;
   verifying the signature using the unique identifier and a cryptographic key of the image sensor; and
   indicating whether the signature was successfully verified.

14. The method of claim 13, wherein the cryptographic key is securely embedded in the image sensor.

15. Method for providing a proof of authenticity of image data generated by an image sensor, the method comprising:
   providing a hash value from an application processor to the image sensor;
   capturing the image data with the image sensor;
   signing a concatenation of the image data or a processed version thereof and the provided hash value using a cryptographic key of the image sensor to generate a signature of the image data, wherein the signature is generated at the image sensor;
   providing the signature, the image data, and a unique identifier of the image sensor to the application processor;
   providing the signature, the image data and/or an image hash value thereof, the provided hash value, and the unique identifier of the image sensor from the application processor to a verifying entity;
   at the verifying entity, verifying the signature using the identifier and a cryptographic key of the image sensor; and
   indicating whether the signature was successfully verified.

16. The method of claim 15, wherein the cryptographic key is securely embedded in the image sensor.

17. Image sensor device, comprising:
   a data communication interface configured to receive a hash value from an external source;
   a cryptographically secure storage storing a cryptographic key of the image sensor device;
   a processor configured to sign a concatenation of captured image data or a processed version thereof and the received hash value using the cryptographic key to generate a signature of the image data, wherein the signature is generated at the image sensor; and
   wherein the data communication interface is configured to transmit the generated signature, the captured image data, and an identifier of the image sensor.

18. The image sensor device of claim 17, wherein the cryptographically secure storage includes a Physical Unclonable Function (PUF) configured to protect the cryptographic key.

19. The image sensor device of claim 17, wherein the cryptographic key is securely embedded in the image sensor.

20. The image sensor device of claim 17, wherein the processor is further configured with countermeasures against side-channel attacks to protect the cryptographic key at runtime.

\* \* \* \* \*